(12) United States Patent
Lantis

(10) Patent No.: US 6,264,836 B1
(45) Date of Patent: Jul. 24, 2001

(54) METHOD AND APPARATUS FOR DECONTAMINATING FLUIDS USING ULTRAVIOLET RADIATION

(76) Inventor: Robert M. Lantis, 20181 Black Horse Sq., Ashburn, VA (US) 20147

( * ) Notice: Subject to any disclaimer, the term of this patent is extended or adjusted under 35 U.S.C. 154(b) by 0 days.

(21) Appl. No.: 09/488,777

(22) Filed: Jan. 21, 2000

Related U.S. Application Data

(60) Provisional application No. 60/160,755, filed on Oct. 21, 1999.

(51) Int. Cl.$^7$ ............................... B01D 19/00; C02F 1/20
(52) U.S. Cl. ................. 210/188; 250/432 R; 250/504 R; 210/192; 210/202; 210/259
(58) Field of Search ..................................... 210/739, 618, 210/188; 422/186.3; 250/432 R

(56) References Cited

U.S. PATENT DOCUMENTS

| | | |
|---|---|---|
| 1,670,217 | 5/1928 | Scheidt . |
| 2,338,388 | 1/1944 | Whitman . |
| 3,485,576 | 12/1969 | McRae et al. . |
| 3,637,342 | 1/1972 | Veloz . |
| 3,814,680 | 6/1974 | Wood . |
| 3,924,139 | 12/1975 | Hirose et al. . |
| 4,103,167 | 7/1978 | Ellner . |
| 4,204,956 | 5/1980 | Flatow . |
| 4,230,571 | 10/1980 | Dadd . |
| 4,246,101 | 1/1981 | Selby . |
| 4,274,970 | 6/1981 | Beitzel . |
| 4,296,066 | 10/1981 | Schenck . |
| 4,304,996 | 12/1981 | Blades . |
| 4,317,041 | 2/1982 | Schenck . |
| 4,336,223 | 6/1982 | Hillman . |
| 4,400,270 | 8/1983 | Hillman . |
| 4,464,336 | 8/1984 | Hiramoto . |
| 4,471,225 | 9/1984 | Hillman . |
| 4,621,195 | 11/1986 | Larsson . |
| 4,661,264 | 4/1987 | Goudy . |
| 4,676,896 | 6/1987 | Norton . |
| 4,757,205 | 7/1988 | Latel et al. . |
| 4,767,932 | 8/1988 | Ellner . |
| 5,230,792 | * 7/1993 | Sauska et al. ..................... 210/97 |
| 5,290,439 | 3/1994 | Buchwald . |

(List continued on next page.)

OTHER PUBLICATIONS

Legan, Robert W.; "Ultraviolet Light Takes on CPI Role," Chemical Engineering, Jan. 25, 1982, pp. 95–100.

Hanzon, Boyd D. and Vigilia, Rudy; "Just the Facts: UV Disinfection," Water Enviroment & Technology Magazine, Nov., 1999, pp. 35–42.

U.S. Environmental Protection Agency; "Wastewater Technology Fact Sheet, Ultraviolet Disinfection," Sep., 1999, EPA 832–F–99–064, (5 pages).

Primary Examiner—Jack Berman
Assistant Examiner—Johnnie L Smith, II
(74) Attorney, Agent, or Firm—Patton Boggs LLP

(57) ABSTRACT

A method and apparatus for decontaminating a fluid, particularly water and wastewater, uses pulsed ultraviolet (UV) light in an automatic pump driven configuration that separately and in real time adjusts each UV reactor module for both water flow and UV power (average and peak intensity) to accommodate a wide range of influent conditions, thereby producing the quality of water discharge desired by the operator. Process control is configured on the basis of a UV transmission-based feedback control loop and on a truly active and independent adjustment of each reactor module, as opposed to the relatively passive and dependent adjustment techniques of the prior art. By matching the condition of the source water to the amount of UV dosage required to produce from it the desired water discharge quality, and then achieving this dosage in real time by the most practical optimum combination of average/peak power and variable pump rate, the method and apparatus represent a new way of achieving automated, high efficiency wastewater decontamination.

26 Claims, 4 Drawing Sheets

U.S. PATENT DOCUMENTS

| | | |
|---|---|---|
| 5,322,569 | 6/1994 | Titus et al. . |
| 5,364,645 | 11/1994 | Lagunas-Solar . |
| 5,368,826 | 11/1994 | Weltz et al. . |
| 5,372,781 * | 12/1994 | Hallet et al. ............... 422/186.3 |
| 5,480,562 | 1/1996 | Lemelson . |
| 4,769,131 | 9/1988 | Noll et al. . |
| 4,816,145 | 3/1989 | Goudy . |
| 4,871,559 | 10/1989 | Dunn et al. . |
| 4,880,512 | 11/1989 | Cornelius et al. . |
| 4,909,931 | 3/1990 | Bibi . |
| 4,910,942 | 3/1990 | Dunn et al. . |
| 5,034,235 | 7/1991 | Dunn et al. . |
| 5,144,146 | 9/1992 | Wekhof . |
| 5,151,252 | 9/1992 | Mass . |
| 5,208,461 | 5/1993 | Tipton . |
| 5,503,800 | 4/1996 | Free . |
| 5,504,335 | 4/1996 | Maarschalkerweerd . |
| 5,536,395 | 7/1996 | Kuennen . |
| 5,547,590 | 8/1996 | Szabo . |
| 5,597,482 | 1/1997 | Melyon . |
| 5,624,573 | 4/1997 | Wiesmann . |
| 5,626,768 | 5/1997 | Ressler et al. . |
| 5,660,719 | 8/1997 | Kurtz et al. . |
| 5,725,757 | 3/1998 | Binot . |
| 5,738,780 | 4/1998 | Markham . |
| 5,768,853 | 6/1998 | Bushnell et al. . |
| 5,900,211 | 5/1999 | Dunn et al. . |
| 5,915,161 | 6/1999 | Adams . |
| 5,919,357 * | 7/1999 | Wilkins et al. ............... 210/120 |
| 5,925,240 | 7/1999 | Wilkins et al. . |
| 5,925,885 | 7/1999 | Clark et al. . |

\* cited by examiner

METHOD AND APPARATUS FOR DECONTAMINATING FLUIDS USING ULTRAVIOLET RADIATION

This application claims benefit of 60/160,755, filed Oct. 21, 1999.

BACKGROUND OF THE INVENTION

This invention relates to a method and an apparatus for decontaminating fluids. More particularly, this invention relates to a method and an apparatus for decontaminating fluids, particularly wastewater, using variable-pulsed ultraviolet (UV) radiation.

The availability of inexpensive, usable water has greatly diminished over this century, and stress upon water resources is expected to increase dramatically with accelerating population and pollution. Throughout the world, industry and governments are increasingly confronted with the challenge and expense of providing modem wastewater facilities that meet public demand and enacting stringent regulatory requirements necessary to produce a cleaner environment. Globally, the need for economic, environmentally friendly industrial wastewater treatment is rapidly approaching a crisis point.

Wastewater (including industrial and municipal wastewater) frequently contains contaminants such as, e.g., microorganisms and toxic organic compounds, which may prove to be toxic in subsequent uses of the water. Examples of microorganisms frequently found in wastewater include bacteria, spores, yeasts, or fungi, algae, etc., including viruses or bacteriophages. Toxic organic compounds found in wastewater include, e.g., cancer-causing aromatic compounds and numerous halogen compounds, particularly chlorine compounds, e.g., chlorinated phenols, etc.

There are many known techniques for disinfecting wastewater, including the use of chemical or physical agents, mechanical means, and UV radiation. Of these, the traditional method of disinfection has been the use of chemical agents in the form of chlorine. Although chlorine disinfection has significantly reduced the incidence of waterborne disease in the United States for many years, growing concerns about chlorine's safety and effect on the environment have prompted wastewater treatment utilities to evaluate other disinfection methods.

To date, the most viable alternative to chlorine disinfection is ultraviolet (UV) disinfection.

Chemical bonds in organic toxins can be broken under the action of the UV radiation through photodissociation. A particular substance will have a characteristic photodissociation curve associated with it specifying the energies and wavelengths of UV radiation for which the particular substance will undergo photodissociation. For effective photodissociation, it is necessary that the UV radiation have the particular energy or energies which fall within the photodissociation curve of the substance of interest.

With respect to microorganisms, disinfection occurs when UV light contacts the microorganism's deoxyribonucleic acid (DNA) molecules, which contain the genetic information necessary for cell replication. The light causes double bonds to form between adjacent subgroups in the DNA structure, preventing normal replication of DNA molecules and thereby inactivating the microorganism.

It is also known that pulsed UV flashlamps can produce a high-power output that is effective for various photodissociation applications, including the disinfection and purification of fluids.

The use of ultraviolet radiation to destroy microorganisms and/or effect photodissociation of organic compounds in wastewater is disclosed, e.g., in U.S. Pat. Nos. 4,661,264 and 4,816,145 (both to Goudy, Jr.); 5,144,146 (Wekhof); 4,400,270 and 4,336,223 (both to Hillman); 5,368,826 (Weltz, et al.); 4,464,336 (Hiramoto); 5,230,792 (Sauska et al.); 5,547,590 (Szabo); 5,900,211 (Dunn et al.); 1,670,217 (Scheidt); 2,338,388 (Whitman); 4,769,131 (Noll et al.); 5,504,335 (Maarschalkerweerd); 4,296,066 and 4,317,041 (both to Schenck); 5,768,853 (Bushnell et al.); 5,597,482 (Melyon); 5,322,569 (Titus et al.); 5,536,395 (Kuennen et al.); 5,915,161 (Adams); 5,208,461 (Tipton); 5,364,645 (Lagunas-Solar et al.); 5,925,885 (Clark et al.); 5,503,800 (Free); 3,485,576 (McRae et al.); 3,814,680 (Wood); 3,637,342 (Veloz); 3,924,139; 4,103,167 and 4,767,932 (both to Ellner); 4,204,956 (Flatow); 4,471,225 (Hillman); 4,621,195 (Larrson); 4,676,896 (Norton); 4,909,931 (Bibi); 5,624,573 (Wiesman); 5,626,768 (Ressler et al.); 5,660,719 (Kurtz et al.); 5,725,757 (Binot); 5,738,780 (Markham); 4,757,205 (Latel et al); 5,290,439 (Buchwald); 5,925,240 (Wilkins, et al.); 4,880,512 (Cornelius et al;); 4,246,101 (Selby, III); 5,151,252 (Mass); 4,274,970 (Beitzel); 4,230,571 (Dadd); 4,304,996 (Blades); and 5,480,562 (Lemelson). See also Legan, R.W., Ultraviolet Light Takes on CPI Role, Chemical Engineering, pp. 95–100 Jan. 22, 1982).

Another article of interest is Hanzon, B. D. and Vigilia, Rudy, Just the Facts: UV Disinfection, Water Environment & Technology Magazine (Nov. 1999), which is hereby incorporated by reference herein.

In many commercial applications, it is highly desirable to deliver UV radiation to a target in a manner that simultaneously produces excellent process efficacy, economic efficiency, and the ability to do so at all times at all required fluid flow rates. Too high a UV dosage can become an unacceptable economic burden, but an insufficient UV dosage can be dangerous.

An ideal UV-based water-disinfection system has a number of advantageous characteristics.

For example, an ideal UV-based disinfection system can provide exact application of the desired UV dosage at all times (in real time) instead of sometimes or much of the time, regardless of the influent's UV transmission level or variances in the influent's pressure or flow rate.

Furthermore, an ideal UV-based water-disinfection system further can confirm the integrity of the operational parameters. For example, the system provides active, real-time control feedback regarding the UV lamp's baseline output level and the influent's UV tansmissivity and flow rate. The system also provides a dynamic and wide-range, real-time response for adjusting the UV light power output and influent flow rate in response to such feedback.

An ideal UV disinfection system also has automatic compensative adaptability to any degradation in one or more UV reactor sections used in the system such that the system provides an active, real-time response to such degradation and assures process integrity, e.g., by not passing non-conforming effluent.

Various UV disinfection systems have been developed in an attempt to provide improved control over the dose parameters. Such systems are disclosed, e.g., in U.S. Pat. Nos. 4,317,041; 4,336,223; 5,144,146; 5,208,461; 5,364,645; 5,547,590; and 5,925,885. However, such conventional systems generally do not have all of the desired characteristics discussed hereinabove in connection with an ideal UV disinfection system. The drawbacks to such systems can be broken down into one or more of the areas discussed below.

For example, one drawback to the conventional UV disinfection systems is their use of continuous wave lamps. Most continuous wave lamps require a warn-up period prior to operation. In addition, most continuous wave lamps are adversely affected by frequent "on-off" cycling, experience excessive jacket fouling, and do not operate efficiently over a wide range of power output.

In another drawback, conventional UV disinfection systems use UV lamps arranged in large banks that constitute a single reactor. With such arrangement of the lamps constituting a single reactor, wide and random variations in UV intensity among the individual lamps can considerably vary the dosage delivered across sections within such reactor. More importantly, accurate monitoring of each lamp's baseline output performance is impractical because every lamp would require a separate UV detector. Therefore, the UV output (and subsequently the performance) of such reactor can only be estimated via discrete probe points that do not necessarily represent anything more than a small section of the reactor. Individual lamp performance is unknown.

A further drawback to the conventional UV disinfection systems is the use of passive flow control devices (e.g., weirs, gate, valves and the like) and gravity flow. As a result, the practical operating ranges of such systems work to restrict the available flow ranges of the reactors used therein. Hydraulic head losses quickly dominate the design equations, thereby limiting reactor performance range. Flow adjustments are relatively slow to execute, and a flow change in any one reactor can adversely create a flow change in adjacent reactors.

Because of the drawbacks discussed above, the conventional disinfection systems are not truly active, real-time or independent, but instead are dependent upon slower, passive techniques for monitoring and adjusting performance parameters. These systems typically exhibit large interaction dependencies among the multiple reactors that constitute an industrial-capacity system. Accurate UV dosage is compromised, along with the ability of the system to adjust parameters as needed for optimized efficiency.

The needs of the water and wastewater disinfection industry for higher system efficiency and lower total cost of operation increasingly necessitates advances beyond those of conventional UV disinfection systems.

Accordingly, a primary object of the present invention is to provide a reliable and cost-effective system (i.e., method and apparatus) for chemical-free decontamination of water (including wastewater).

A further object of this invention is to provide a UV-based decontamination system which has the capability to instantly adjust the output power of the UV reactors over a wide range, thereby instantly adjusting the UV dosage when required.

Another object of this invention is to provide a UV-based decontamination system which uses a single UV light source in each UV reactor, whereby the performance of the single UV light source consistently and accurately represents the performance of the entire reactor.

A still further object of this invention is to provide a UV-based decontamination system wherein, in each UV reactor, the baseline UV light output from the UV light source can be accurately determined at any given instant, as can the actual UV transmission within the reactor.

Yet another object of this invention is to provide a UV-based decontamination system wherein each UV reactor is capable of controlling the influent flow rate within that reactor, can instantly achieve upon command a very wide and precise range of operation, and exhibits zero hydraulic head loss, further wherein each UV reactor is capable of doing the foregoing independently of and without interaction with the other UV reactors within the system.

Another object of this invention is to provide a UV-based decontamination system which has monitoring and control feedback means that can provide an active, real-time response for system parametric optimization, and can do so with complete independence among the UV reactors constituting the system.

A further object of this invention is to provide a UV-based decontamination system capable of accurate and fail-safe optimization of UV dose throughout the entire range of operating conditions that are typically encountered in large-scale UV photodissociation applications.

These and other objects are achieved in the present invention.

SUMMARY OF THE INVENTION

The present invention provides a UV-based decontamination system that destroys microorganisms and causes photodissociation of organic contaminants in fluids, such as water and wastewater. The decontamination system of the present invention uses variable-pulsed UV light in an automatic pump-driven configuration that separately and in real-time adjusts each reactor module for both fluid flow and UV power (average and peak intensity) to accommodate a wide range of varying influent conditions, thereby producing the quality of fluid discharge desired by the operator. Process control is configured on the basis of a UV transmission-based feedback control loop and on a truly active and independent adjustment of each UV reactor module, as opposed to the relatively passive and dependent adjustment techniques used in many conventional UV-based decontamination systems.

Specifically, the present invention provides a UV-based method and apparatus for decontaminating fluids, such as water and wastewater, contaminated with UV-sensitive microorganisms and/or organic compounds.

The apparatus of this invention contains:
(A) a single UV reactor module or a plurality of UV reactor modules, each UV reactor module being composed of:
(1) an influent flow conduit;
(2) a variable speed pump disposed in the influent flow conduit, the pump being rotatable at a speed determined by a pump-speed control signal;
(3) a UV reactor disposed in the influent flow conduit downstream of the variable speed pump, the UV reactor having an interior chamber containing:
(i) a reactor flow passage disposed downstream of and in fluid communication with the influent flow conduit, the reactor flow passage having an inlet and an outlet;
(ii) a UV flashlamp disposed in the reactor flow passage and capable of emitting one or more pulses of ultraviolet light having a wavelength in the UV-C band, preferably from about 200 to about 300 nanometers, wherein the flashlamp emits the one or more pulses at a UV intensity and pulse duration determined by a lamp-output control signal; and
(iii) at least one UV transmission detector disposed at a location in the reactor flow passage so as to measure UV transmissivity of a portion of a stream of the fluid passing proximate to the location, the detector being capable of generating an output signal indicative of the measured UV transmissivity; and (B) a system-wide control module disposed in independent electrical communication with each UV reactor module, the system-wide control module being capable of generating the pump-speed control signal and the lamp-output control signal and of receiving the UV-transmissivity output signal, the system-wide control module being programmable to generate additional pump-speed control signals and lamp-output control signals in response to the UV-transmissivity signal so as to cause subsequent portions of the stream exposed to the one or more pulses of ultraviolet light to receive a targeted UV dose.

In a preferred embodiment of the apparatus of this invention, each UV reactor module further contains a microprocessor-based reactor-control unit, (e.g., a programmable logic controller (PLC), a small computer, a custom-built logic board) which is disposed in electrical communication with the system-wide control module and with the variable-speed pump, the UV flashlamp and the UV transmission detector of the reactor module.

The method of this invention involves the steps of:

(1) providing the above-described apparatus of this invention, wherein the control module is preprogrammed to send a first pump-speed control signal to the pump in each UV reactor module to cause the pump to rotate at a speed sufficient to provide a predetermined first flow rate through the influent flow conduit and the reactor flow passage; further wherein the control module is preprogrammed such that as a fluid stream flows through the reactor flow passage, the control module sends a first lamp-output control signal to the UV flashlamp in each UV reactor module to cause the flashlamp to emit one or more pulses of ultraviolet light at a predetermined first UV intensity and at a predetermined pulse duration, the one or more pulses of ultraviolet light having a wavelength in the UV-C band (which is the band that effects disinfection of microorganisms and photodissociation of organic compounds), preferably from about 200 to about 300 nm;

(2) directing flow of a stream of the fluid through the influent flow conduit, the stream passing through the influent flow conduit at the predetermined first flow rate; and (3) directing flow of the stream through the reactor flow passage from the inlet to the outlet thereof such that the stream passes proximate to the UV flashlamp and proximate to the UV transmission detector, the stream flowing through the passage at the predetermined first flow rate; wherein during flow of the stream through the flow passage, a portion of the stream is exposed to the one or more pulses of ultraviolet light emitted by the UV flashlamp in response to the first lamp-output control signal generated by the control module; the UV transmission detector measuring UV transmissivity of a portion of the stream passing proximate to the detector and transmitting a UV transmissivity output signal to the control module indicative of the measured UV transmissivity, wherein the control module is preprogrammed to analyze said UV transmissivity signal to determine whether the portion of the stream subjected to the one or more pulses of ultraviolet light received a targeted UV dose, further wherein if said portion of the stream did not receive the targeted UV dose, the control module is preprogrammed to send (i) a second pump-speed control signal to effect a second flow rate in the influent flow conduit and the reactor flow passage, and/or (ii) a second lamp-output control signal to effect emission of one or more pulses of ultraviolet light at a second UV intensity and/or a second pulse duration; wherein the second flow rate and/or the second UV intensity and/or the second pulse duration are such subsequent portions of the stream exposed to the one or more pulses of ultraviolet light receive said targeted UV dose.

The apparatus of the present invention may contain a single UV reactor module or a plurality of UV reactor modules. Preferably, the apparatus contains a plurality of UV reactor modules disposed in a parallel or a serial arrangement, preferably a parallel arrangement.

The apparatus and method of this invention provide a reliable and cost-effective system for effecting chemical-free decontamination of water, wastewater and other fluids contaminated with UV-sensitive substances. The system-wide control module used in the present invention separately and in real time adjusts water flow and/or UV power output in each reactor module to accommodate a wide range of varying influent conditions. Embodiments of the apparatus of this invention which use a UV flashlamp disposed coaxially relative to the influent flow conduit and to the reactor flow passage further simplify the delivery of UV light and provide a less cumbersome approach towards an accurate calculation of performance.

DETAILED DESCRIPTION OF THE INVENTION

Figure 1:
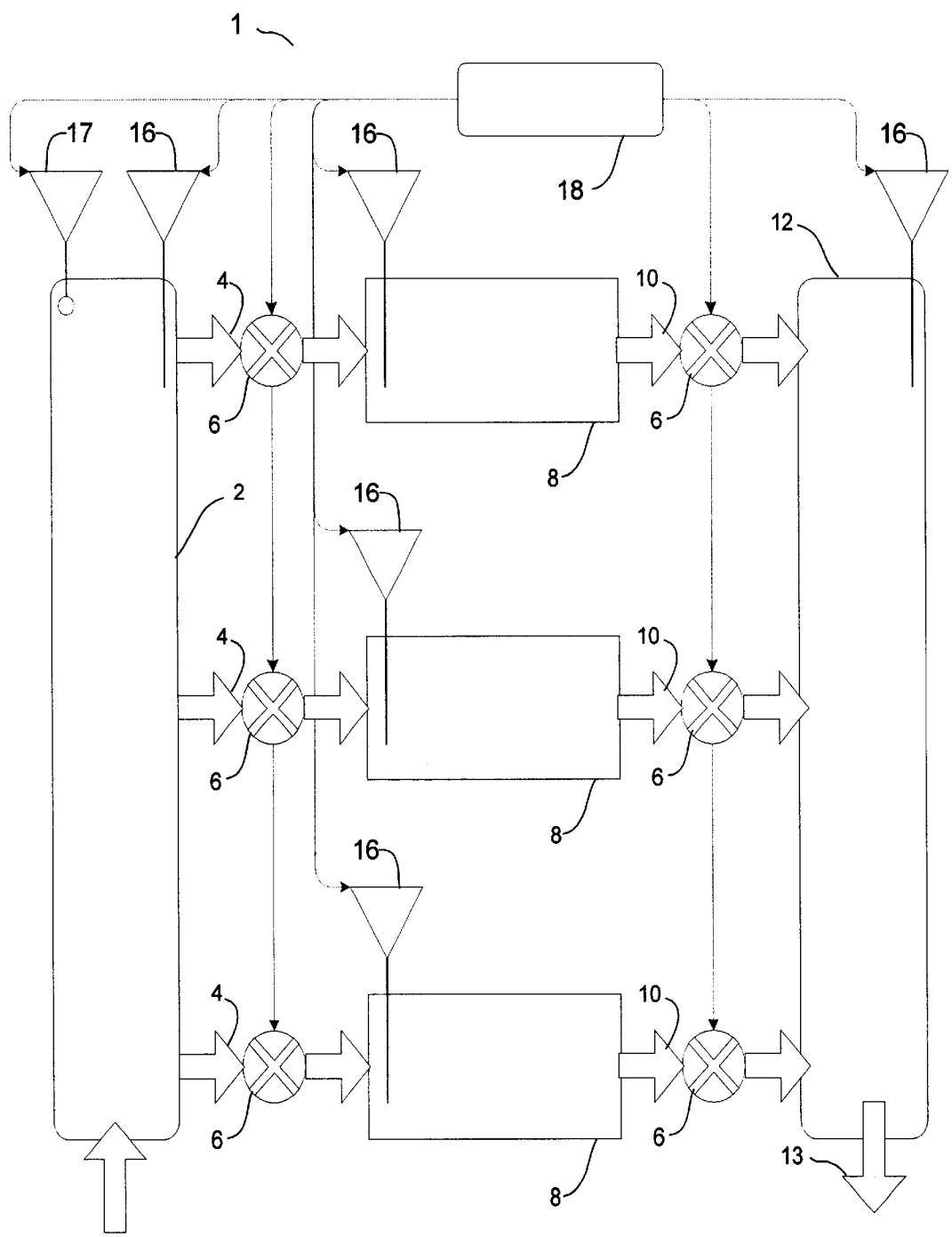
FIG. 1 is a schematic illustration of a typical prior art UV-based decontamination system for use in large-scale, high-throughput installations.

As stated hereinabove, the present invention provides a method and apparatus for decontaminating fluids using pulsed ultraviolet radiation. The fluids treated are those which are contaminated with UV-sensitive microorganisms and organic compounds.

As used herein, the terms "decontaminate", "decontaminating" and "decontamination" refer to the ability of the method and apparatus of the present invention to destroy microorganisms and cause photodissociation of organic compounds. More particularly, the foregoing terms means that the method and apparatus are capable of killing or rendering unable to reproduce at least a substantial portion of the microorganisms present in the fluid being treated, and capable of causing photodissociation of at least a substantial portion of the organic toxic compounds present in the fluid being treated so as to form non-toxic end-products. Thus, as used herein, the term "decontamination" is meant to include both photodissociation and chemical disinfection.

As used herein with respect to the fluids being treated by the method and apparatus of this invention, the term "contaminated" means that the fluid contains an undesirable amount of UV-sensitive microorganisms and/or organic compounds.

As used herein, the term "UV-sensitive" with respect to the microorganisms and organic compounds contaminating the fluid means that microorganism will be destroyed and the organic compounds will undergo photodissociation when subjected to UV radiation.

By way of illustration, the invention will be described herein as applied to the decontamination of waste water. However, it is to be understood that the instant invention may be used to decontaminate a variety of other fluids.

The present invention uses the output spectra of pulsed UV flashlamps in various combinations of average and peak power intensity. Preferably, the pulsed flashlamps used in the present invention have a power output range of a factor of 30 or more.

The UV flashlamps used in the present invention are capable of emitting high-intensity, short-duration pulses of ultraviolet light. Pulsed, gas-filled flashlamps such as those used in the present invention produce broadband light when an electrical current pulse is discharged through the flashlamp, ionizing the gas and producing an intense burst of both continuum and line emission over a broad spectral range. Such flashlamps typically employ inert gases such as xenon or krypton because of their high efficiencies of electrical to optical energy conversion. The use of other gases or gas mixtures and gas discharge systems is possible and may be desirable for specific applications.

Suitable UV flashlamps and attendant pulse-generating hardware for use in the present invention are described, for example, in U.S. Pat. Nos. 4,871,559; 4,910,942; and 5,034,235; each of which is incorporated herein in their entirety.

The UV flashlamps used in the present invention are capable of emitting ultraviolet light having a wavelength in the UV-C range, preferably from about 200 to about 300 nanometers (nm). UV radiation of this wavelength is particularly effective in photodisinfection because microorganisms show maximum sensitivity in this range.

Each of the high-intensity, short-duration pulses of ultraviolet light emitted by the UV flashlamp in the method of this invention preferably have an intensity of at least 0.01 Joules per square centimeter, more preferably from about 0.01 to about 50 Joules per square centimeter. Each pulse preferably has a duration of from about 0.001 to about 100 milliseconds.

The pulse repetition rate of the radiation emissions preferably ranges from about 0.5 to about 30 Hertz.

Preferably, each flashlamp will provide a UV-C output of from about 1 million to about 6 million watts of peak power per pulse.

Each UV flashlamp is preferably housed in a waterproof, protective housing such as a UV-transparent quartz tube. The housing (or jacket) itself is cool so that inorganic contaminants do not attach thereto.

The reactor modules can be made of a UV-resistant metal such as stainless steel or other UV-resistant materials.

The transportable, module-based configuration of the apparatus of this invention advantageously produces in real time an active, independent and precise pump-based flow adjustment to each UV reactor module, thereby accommodating an extremely widened range of influent conditions with minimal impact upon the infrastructure of treatment facilities. Each reactor module incorporates an integral variable-speed pump, preferably a positive displacement pump that provides an accurate indication of flow rate in real time. This allows not only a positive shut-off capability, but also a practical output range over a factor of 15 or greater.

This technique is combined with the instantaneous UV power adjustment of pulsed flashlamps with a power output range of a factor of 30 or more. By this method, the flow rate of any one UV reactor module does not physically force a change in the flow of any other UV reactor module. In an advantageous departure from the prior art, no UV reactor module in the apparatus of the present invention must necessarily compromise its own performance because of the flow rate changes induced by any other UV reactor module. Therefore, all the UV reactor modules used in the apparatus of this invention are then capable of independently achieving optimum UV dosage.

The monitoring and coordination of the method of this invention is provided by an intelligent control system (i.e., control module in FIGS. 2 and 3 or the combination of control module 28 and PLC unit 62 in FIG. 4) that calculates the optimum operating scenario for any given set of influent conditions, independent UV reactor module(s) performance conditions, and the required output conditions of the effluent. The control system actively and independently regulates flow rate, UV power output, or both, in each of the UV reactor modules.

FIG. 1 illustrates a typical UV decontamination system of the prior art.

FIG. 1 illustrates a prior art method for decontaminating water using UV radiation. In such prior art method, an influent channel or reservoir 2 is used to hold and/or move the water (not shown) to be treated. Disposed in fluid communication with reservoir 2 are a plurality of influent conduits 4. Substreams (not shown) of the water are made to flow through influent conduits 4 in the directions shown. Conduits 4 contain gravity-flow-based weirs or gate controls 6 which provide mechanical flow adjustment. From conduits 4, the influent water substreams flow in the directions shown past banks 8 of UV flashlamps. After exposure to ultraviolet light emitted by the flashlamp banks 8, the resulting effluent substreams flow through effluent conduits 10 which also contain weirs or gate controls 6. From conduits 10, the effluent substreams flow to an effluent channel or reservoir 12, where the substreams will be available for pickup and delivery elsewhere. Flow rate sensors 16 are disposed in the influent reservoir 2, the UV flashlamp banks 8 and the effluent reservoir 12. Influent reservoir 2 further has a turbidity sensor 17 disposed therein. The prior art method illustrated in FIG. 1 further uses a control system 18.

A drawback to the prior art system shown in FIG. 1 is the use of passive mechanical flow adjustment means, i.e., weirs or gate controls 6, which tend to be expensive, cumbersome, slow-to-adjust, and with limited capacity and/or adjustment. These adjustment means typically work in conjunction with spare banks of continuous wave (i.e., non-pulsed) UV lamps that are either left in-line or physically removed as required. This system typically relies upon gravity flow and, as a result, are very sensitive to hydraulic pressure head loss. Despite the theoretical capabilities of such a system, the practical implementation has shown a very much restricted capacity for changes in flow rate. Any attempt to accommodate a flow adjustment in one lamp bank, channel or manifold, whether it be by an adjustment in lamp output and/or lamp temperature, UV transmission, contaminant levels, or influent flow rate, can adversely affect the flow rate and UV reactor performance in other branches of the system. This reactor-to-reactor dependency further limits the available range of operation. Installations that use such systems also require extensive construction of and modification to wastewater facilities, along with a lengthy design-to-startup schedule.

Figure 2:
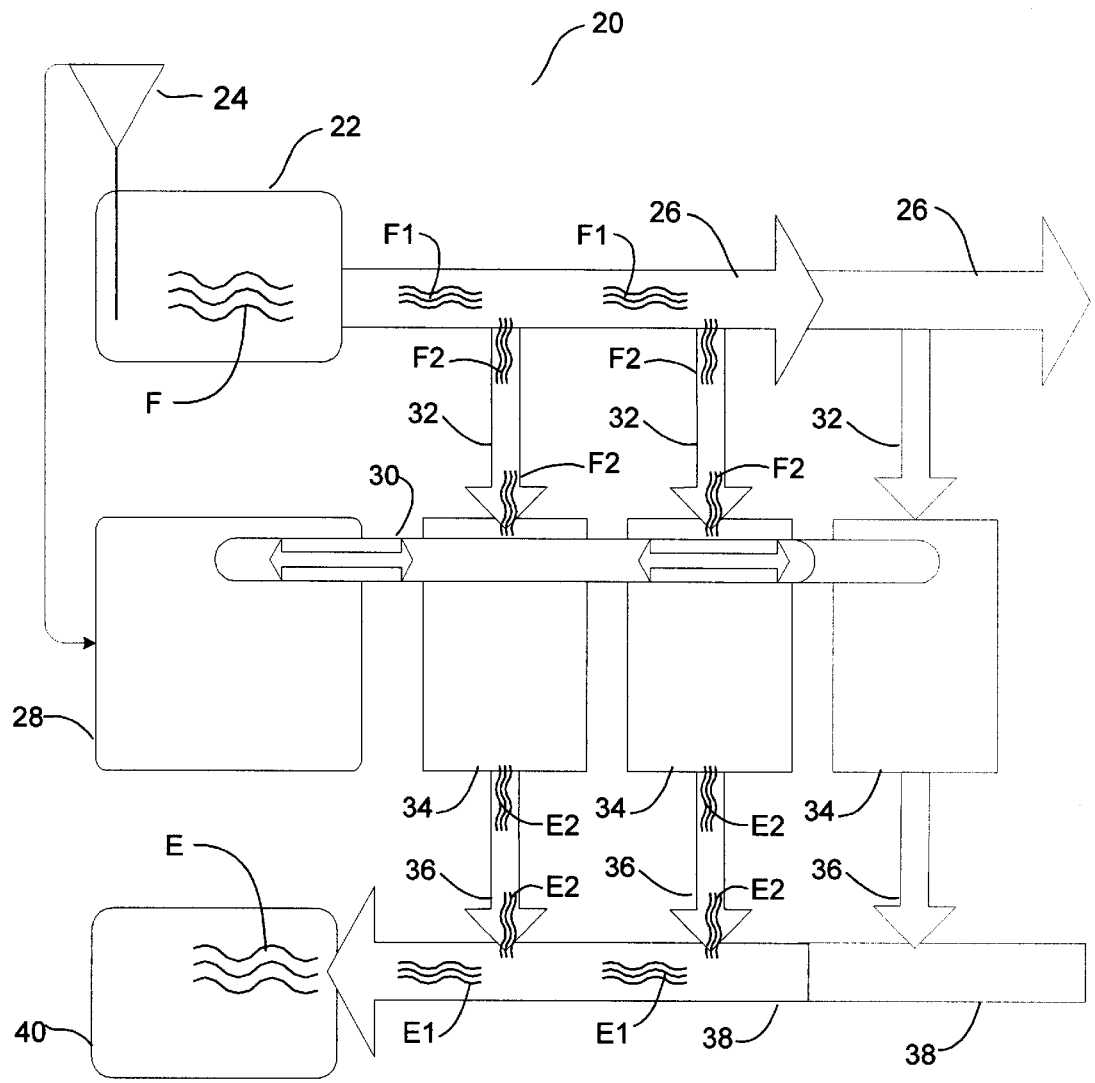
FIG. 2 is a schematic illustration of a preferred embodiment of a UV-based fluid-decontamination system within the scope of the present invention.
Figure 3:
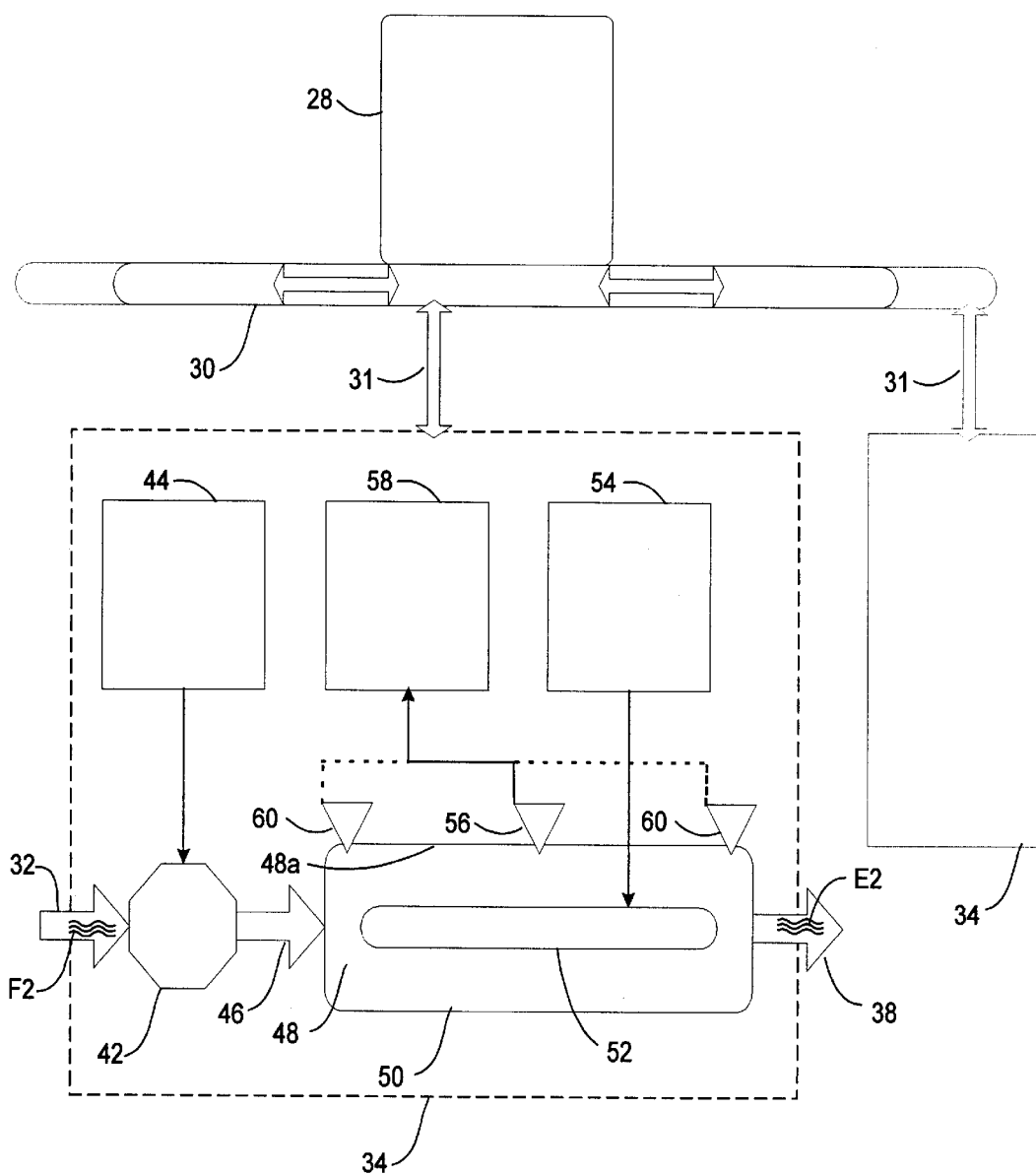
FIG. 3 is a schematic detailed illustration of the UV reactor module used in the system illustrated in FIG. 2.

A simpler, quicker and more capable system is needed by industry and is provided by the present invention as illustrated in FIGS. 2 and 3.

FIG. 2 shows a preferred embodiment of a decontamination method and apparatus within the scope of the present invention.

In FIG. 2, decontamination apparatus 20 includes an influent channel or reservoir 22 for holding and/or moving an influent fluid F to be decontaminated. Preferably disposed within reservoir 22 is a fluid level sensor 24, which is connected to a system-wide control module 28 composed of a stored program microprocessor. With respect to control module 28, the term "system-wide" means that the control module exerts control over all of the UV reactor modules. Connected to a side of reservoir 22 is an influent fluid conduit 26 which directs flow of a stream F1 of the influent fluid F in the direction shown. Commands (signals) transmitted by control module 28 via control bus 30 cause fluid stream F1 to become divided into fluid substreams F2 which flow from conduit 26 into influent flow conduits 32. Conduits 32 direct flow of substreams F2 in the direction shown into a parallel arrangement of independently adjustable UV reactor modules 34. Note that although the UV reactor modules are disposed in a parallel arrangement in FIG. 2, the UV reactor modules alternatively can be disposed in a serial arrangement.

UV reactor modules 34 are independently controllable relative to one another. As will be discussed in greater detail herein with respect to FIG. 3, substreams F2 are subjected to ultraviolet rays in UV reactor modules 34 which will kill microorganisms and/or cause photodissociation of toxic organic compounds present in the substreams.

Once treatment of substreams F2 in UV reactor modules 34 is complete, the resulting decontaminated substreams E2 flow out of modules 34 in the direction shown into effluent flow conduits 36. Effluent substreams E2 flow through conduits 36 into effluent fluid conduit 38, where the effluent substreams can be combined into a single effluent fluid stream E1. If desired, the effluent stream can then be transported in the direction shown to an effluent pick-up point 40 from which effluent fluid E can be picked up and delivered as desired.

FIG. 3 illustrates a greater detailed view of the UV reactor module 34 used in the apparatus of FIG. 2.

As shown in FIG. 3, influent fluid substream F2 enters UV reactor module 34 in the direction shown via influent flow conduit 32. Substream F2 enters module 34 according to a flow rate established by the rotational speed of integral (i.e., built-in) variable speed pump 42. The rotational speed of pump 42 is set by control module 28 through control bus 30. Control module 28 transmits the appropriate rotational speed command (i.e., a pump-speed control signal) to pump 42 via vanable-speed pump controller 44. At the flow rate established by control module 28 and executed by pump 42, substream F2 is passed through flow conduit 46 in the direction shown into an interior flow chamber 48 of UV reactor 50. Disposed within chamber 48 of UV reactor 50 is a coaxially arranged, pulsed linear flashlamp 52 which will emit pulsed ultraviolet light in response to a command (i.e., a lamp-output control signal) sent by control module 28 through control bus 30 and flashlamp driver 54. Flashlamp driver 54 contains a pulse-forming network (not shown) and a power supply (not shown). The influent substream F2 fills chamber 48 externally to flashlamp 52. Situated at an inner wall 48a of chamber 48 is one or more UV transmission detectors 56, preferably positioned in an orientation in direct line-of-sight with the flashlamp 52.

Upon command from control module 28 and by means of control/reactor interface connector 31, flashlamp driver 54 sends through its pulse-forming network and then into flashlamp 52 a short, high peak power pulse of electrical energy that ionizes the gas (e.g., xenon) contained within flashlamp 52 to produce a high-temperature plasma which emits a pulse of UV light. This pulse of UV light irradiates the fluid-filled volume within the chamber 48 of UV reactor 50. Some of this light is absorbed by components in substream F2, such as suspended solids and dissolved solids. The resulting UV fluence upon UV transmission detector(s) 56 is captured by a detector interface 58 which sends a corresponding signal to control module 28 through control bus 30. Control module 28 analyzes the signal received from detector interface 58 by means of any one of several acceptable differential measurement methods, resulting in a datum that represents the "UV transmissivity" for that particular slice (i.e., substream F2) of influent fluid encountered during that single pulse of UV light.

Meanwhile, the single pulse of UV light has also irradiated a large percentage of microorganisms and/or organic compounds. Based upon (i) the volume size of chamber 48 of UV reactor 50, (ii) the known UV peak power per pulse, and (iii) the known UV transmission for that pulse, the control module 28 then calculates the UV dose (Joules$_{UV-c}$/m$^3$) applied to chamber 48 during that pulse of UV light. Note that this UV dose is not a time-based dose rate but a discrete quantity. Comparing this single UV dose to that which has been determined by the operator to be the targeted dose, control module 28 then calculates how many pulsed doses of UV light are required for a given volume of fluid at a given flow rate and proceeds to perform this in an identical process for each pulse. At any instant, the operating parameters can be adjusted as required by control module 28.

By the time substream F2 has passed through chamber 48 of CV reactor 50, the substream has received the dose of UV light designated by the operator and then commanded and verified by control module 28. The resulting decontaminated effluent E2 then exits chamber 48 of UV reactor 50, and, as discussed above in connection with FIG. 2, enters effluent conduit 38.

A preferred embodiment of the detector interface 58 makes it possible to use in each UV reactor module 34 one or more auxiliary contaminant level detectors 60 disposed to monitor indicator organisms or compounds. Preferably, a detector 60 will be disposed at an inlet (i.e., upstream) end of chamber 48 and another detector 60 will be disposed at an outlet (i.e., downstream) end of chamber 48. Such arrangement (i.e., an "influent-effluent detection arrangement") of detectors 60 is particularly advantageous in that it provides closed-loop feedback capabilities that can further increase the accuracy and efficiency of large-scale UV photodissociation applications.

As stated above in connection with FIG. 2, a fluid level sensor 24 is preferably disposed within influent reservoir 22. Level sensor 24 provides fluid level rate-of-change information to control module 28 which uses this information to calculate the influent flow-rate demand by subtracting the combined flow rates of the UV reactor modules 34. At any instant, control module 28 knows the combined decontamination system flow rate because the rotational speed of the integral variable-speed pump 42 incorporated in each reactor module 34 sets the flow rate for the respective reactor module 34 and this rotational speed is set by control module 28. Data communication between the control module 28 and the reactor modules 34 takes place along control bus 30 and control/reactor interface connector 31.

With the flow rate demand established, the control module 28 has the built-in intelligence to monitor and analyze the operating conditions for each reactor module 34 and then determine the optimum control settings for each reactor module 34 that will create the net total output required for the entire decontamination system. Factors specific to reactor module 34 that contribute to this; analysis include: baseline output level per pulse of the UV flashlamp, filtered UV output level per pulse of the UV flashlamp, influent UV transmission per pulse, UV dose per pulse, pulse repetition rate, flow rate through chamber 48 of UV reactor 50, average UV dose per reactor module ($J_{uv-c}/m^3$) and warnings, alarms and operational readiness in each reactor module 34. Factors specific to the control module 28 that contribute to the analysis include: system flow-rate demand, required UV dose for decontamination compliance ($J_{uv-c}/m^3$), calculations and/or look-up tables for decontamination design parameters, site-specific operational criteria, decontamination system limits, warnings, alarms and readiness plan, operating and service history data storage, and external communications for monitor, remote operation and service.

In the apparatus of this invention, if any reactor module 34 is, at any instant, outside of established limits, the apparatus can immediately and in real time be automatically disengaged from the apparatus's output, thereby ensuring full compliance at all times. Additionally, the "zero hydraulic head loss" design of the apparatus of this invention not only presents the advantage of pressure-isolated and truly independent reactor module operation, but also the potential for the entire UV decontamination apparatus to contribute essentially zero hydraulic head loss to the wastewater facility.

Figure 4:
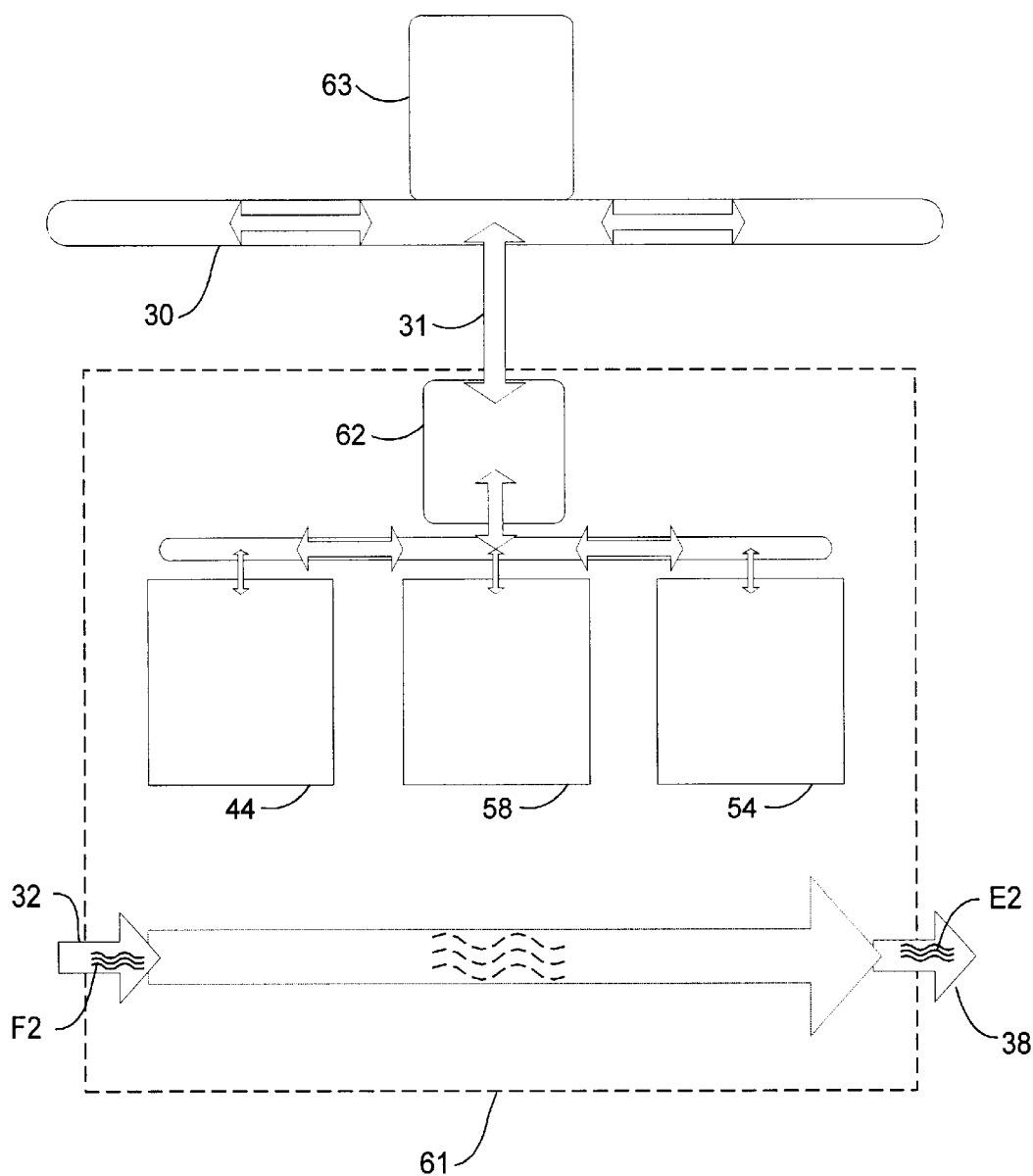
FIG. 4 is a schematic illustration of an alternative embodiment of the UV reactor module shown in FIG. 3, wherein, in the alternative embodiment, the UV reactor module further includes a microprocessor-based, programmable logic controller unit.

FIG. 4 illustrates a preferred embodiment of the UV reactor module(s) used in the present invention. In this embodiment, each reactor module 34 further contains a microprocessor-based reactor-control unit 62. Reactor-control unit 62 is disposed in electrical communication with a system-wide control module 63 and with variable-speed pump controller 44, UV flashlamp driver 54, and detector interface 58.

The use of reactor-control unit 62 redistributes some of the considerable microprocessor power and functionality of the system-wide control module. As mentioned previously, by using a reactor-control unit in each reactor module, each reactor module can perform much of its reactor-specific monitoring and calculations, thereby off-loading both the I/O control bus traffic and the time-sensitive, simultaneous multiple-reactor module-specific monitor and calculation requirements of the control system. Thus, the system-wide control module 63 used in the FIG. 4 embodiment will be one which does fewer calculations than the system-wide control module 28 used in the embodiment shown in FIGS. 2 and 3. The embodiment of FIG. 4 still leaves control module 63 with overall, upper hierarchy system control. Control module 63 receives reactor performance monitor and alarm signals from each independent reactor module 34, evaluates and determines the optimum system parametric configuration, and sends to each reactor module 34 the assigned parameters which the respective reactor module 34 is to operate. The lower power microprocessor-based control unit 62 within each reactor module 34 receives from the control module 63 the parametric control signals specifically assigned to the respective reactor modules 34, calculates and sets the UV dosage according to the internally monitored data (UV transmission, UV output, flow-rate, and the like), monitors and adjusts accordingly, and then reports reactor output back to control module 63.

Because the UV decontamination method and apparatus of this invention are ideally suited for (but not limited to) parallel operation of the reactor modules, the apparatus can be sized to the wastewater facility's requirements by simply selecting the number of identical and transportable reactor modules that will accommodate those needs.

As discussed previously herein, the decontamination apparatus of this invention advantageously produces in real time an active, independent and precise pump-based flow adjustment to each UV reactor module, thereby accommodating an extremely widened range of influent conditions with minimal impact upon the infrastructure of treatment facilities. Each reactor module incorporates an integral variable-speed pump such that the flow rate of any one UV reactor module does not physically force a change in the flow of any other UV reactor module. Thus, unlike the prior art decontamination apparatus shown in FIG. 1, none of the UV reactor modules in the apparatus of the present invention compromises its own performance because of the flow rate changes occurring in other UV reactor modules. As a result, all the UV reactor modules used in the apparatus of this invention are capable of independently achieving optimum UV dosage.

While much controversy exists within the continuous wave lamp community over the means or calculating UV dose, it has appeared most convenient to view UV dose as being the average fluence rate times the exposure time (in seconds). Most authors have used the units mw-s/cm² (milhwatt-seconds per square centimeter). This is most simply expressed by Equation (I) below:

$$D = I \cdot t \qquad (I)$$

Where:
D=UV dose, mW-s/cm²
I=average intensity of the germicidal UV energy, mW/cm²
t=exposure time, seconds The actual UV fluence rate in the typical, multiple-source continuous wave lamp reactor is a very complex calculation and, in addition to consideration of the hydraulic flow rate variability, usually involves a Multiple Point Source Summation approximation in order to accommodate the considerable variation in UV output throughout the reactor volume. The light intensity field around a hypothetical point-source along the axis of a CW lamp can be described by Equation (II) below:

$$I(r, z)_i = \frac{\frac{P}{n}}{4\pi\rho^2} \exp\left[-(\alpha_q \cdot t_q + \alpha_l(r - r_l))\frac{\rho}{r}\right] \qquad (II)$$

Where:
r, z=radial and longitudinal coordinates (respectively) in a cylindrical coordinate system with the origin on the axis of the axis of one end of the lamp
$I(r, z)_i$=intensity at location (r, z) attributable to the $I^{th}$ point source
P=lamp output power
n=number of point sources used to represent the lamp
ρ=distance from point source to location (r, z)
$a_q$=absorption coefficient for quartz envelope
$t_q$=thickness of quartz jacket envelope
$a_l$ =absorption coefficient for water
$r_l$=lamp radius For any location (r, z) the total intensity received is the sum of the contributions from all of he point sources within the system, as shown in Equation (III) below:

$$I(r,z) = \sum_{i=1}^{n} I(r,z) \quad \text{(III)}$$

Where:

Equations (II and III) represent the basic Point Source Summation model. Since this model provides spatially-dependent information about the light intensity field, this information can be used for the prediction of radiation dose accumulated by each particle in the in fluent stream. Such prediction is illustrated in Equation (IV) below:

$$dose_i = \int_0^\tau I(t)\,dt \quad \text{(IV)}$$

Where:

$dose_I$ =UV dose received by the $I^{th}$ particle
I(t)=time-dependent UV intensity
t=time
τ=residence time of a particle within the irradiated volume The inactivation of bacteria historically has been approximated by first-order kinetics, and is considered accurate for "ideal" conditions, according to Chick's law (Chick, 1908):

$$N = N_0\, e^{(-kIt)}$$

Where:

N=bacterial density after exposure to UV light
$N_o$ =initial bacterial density
K =inactivation rate constant (cm²/W-s)
I=intensity of the UV light energy (W/cm²)
t=exposure time (seconds)

In attempts to formulate UV decontamination design models, practitioners have developed more complex models that necessarily must include numerous empirically-based data parameters. These models then become the basis for predicting system performance. It is outside the scope of this invention to tackle the existing controversy over which model is currently the best for UV decontamination performance prediction, the excellent work of Blatchley, et. al., not withstanding (e.g., Ernest R. Blatchley III [1998] "Optimization of Process Performance in Ultraviolet Disinfection Systems," Water Environment Federation Proceedings, Disinfection '98 The Latest Trends in Wastewater Disinfection: Chlorination vs. UV Disinfection).

However, in order to make a distinction between this invention's method and those of the prior art, the UV disinfection model (Scheible, 1987) that became the basis for the model reported in the US EPA Design Manual for Wastewater Disinfection (1986) and cited in the Wastewater Disinfection Manual (Water Pollution Control Federation, 1986) will be used herein. Such model is illustrated in Equation (V) below:

$$N = N_0 \exp\left\{\frac{ux}{2E}\left[1 - \sqrt{\left(1 + \frac{4KE}{u2}\right)}\right]\right\} + N_p \quad \text{(V)}$$

Where:

u=velocity of wastewater through the reactor (cm/s)
x=average distance traveled by water under exposure to UV light (cm)

E=dispersion coefficient (cm²/s)
K=inactivation rate constant (s⁻¹)

The inactivation rate, K, is an estimation based upon an empirical relationship shown in Equation (VI) below:

$$K = \alpha(I_{avg})^b \quad \text{(VI)}$$

Where:

$I_{avg}$=average UV light intensity within the reactor
a, b=empirical coefficients specific for wastewater conditions Note that this method, along with most other disinfection calculations required for continuous wave lamp processes, must necessarily be concerned with typically reactor-specific and varying time-based terms, such as: exposure time, particle residence time, reactor water velocity, and time-dependent UV intensity.

In the present invention, the use of a single pulsed lamp in each reactor simplifies both the accurate delivery and determination of UV dose. This is because the discrete, pulsed-energy delivery method of UV flashlamp technology can remove the time-dependent element from the calculations. When one knows the reactor's flow rate (in m³/sec), and indeed, this invention provides for this information at any instant, then the terms "average fluence rate" and "exposure time" can both be replaced by "UV Joules per pulse" ($J_{UV-C}$)times the "pulse repetition rate" (Hz). Therefore, we can simply and more conveniently measure UV-C dose in terms of average UV-C Joules per cubic meter ($J_{UVC}$/m), and base our disinfection model(s) upon this accurately quantified variable.

Additionally, the coaxial arrangement within the reactor of a single, linear light source (a pulsed, high-intensity UV flashlamp) further simplifies the delivery of UV light and provides a less cumbersome approach towards an accurate calculation of performance. It is also advantageous to calculate a UV reactor's actual performance in real-time, instead of basing a real-life operation of the process method (and primarily relying upon predictions of reactor performance. The method of this invention embodies this important distinction.

It is well known that various UV disinfection operations can more efficiently achieve a desired outcome by determining the optimum UV delivery conditions for the specific process. This process is a matter of balancing the three primary contributing factors: fluid flow rate, fluid condition (contaminant levels and UV transmission characteristics), and the amount of UV power applied to (and subsequently absorbed) by the targeted organism or compound. Since these three factors dominate the process and largely determine the process efficacy, it is these three factors that are addressed by the method taught herein.

Although U.S. Pat. No. 5,144,146 ("the '146 patent") sets forth teachings regarding the framework around which toxic substances may be destroyed by the light from pulsed UV flashlamps (in terms of bandwidth, average and peak power intensities, and so on), such teachings are in reality a simple summation of the boundary conditions wherein nearly all successful UV dissociation processes have been openly performed by so many others over the past few decades. The fact that the broad conditions outlined in the '146 patent do encompass a large multitude of real and potential process operations (that are entirely unspecified and, likewise, without corresponding specific UV requirements) does not in any manner express anything in particular, other than what has for decades been a very general and common knowledge among those familiar with the art. That is: the variable power output of pulsed flashlamps can be tailored to fit the desired UV conditions determined best for a particular photodissociation process. If one defines the range of the various energy delivery modes (such as average and peak power, and so on) that are useful for nearly all UV flashlamp-based photodissociation process, then that range would in essence be those conditions set forth in the '146 Patent.

Therefore, this present invention utilizes the output spectra of pulsed flashlamps in various combinations of average and peak intensity within (and even outside, i.e., <5 Hz pulse repetition rate) the operational bounds specified by the '146 Patent, as have essentially all other users of UV flashlamp technology over the decades. The open literature clearly makes this evident. Indeed, this flexibility in output configuration afforded by pulsed high intensity lamps has always made them an ideal candidate where greatly varying amounts and intensities of UV light is beneficial.

In prior art attempts to simultaneously accommodate both varying influent and lamp output conditions, previous processes such as that taught, eg., in U.S. Pat. No. 4,336,223 to Hillman, have utilized turbidity detectors in a feedback loop. Turbidity is defined as the reduction of transparency in water due to the presence of suspended particles. Although the measurement of turbidity and its contribution towards an optimized UV dosage is considered a claim of this prior art, turbidity is actually just one factor affecting the ability of UV light to penetrate the reactor volume, or UV transmission. For instance, minute amounts of certain commonly encountered industrial waste can drastically lower the percentage of UV transmission, even though turbidity measurements upon that same fluid might indicate a low turbidity level. When UV dose is determined via such low turbidity readings, the consequentially incorrect assumptions result in inadequate UV dose and non-compliant discharges from the process.

The Beer-Lambert Law describes how light is attenuated when any material within a fluid absorbs that light. The attenuation factor or transmittance $T\lambda$) for a given light beam of wavelength where the attenuation is due primarily to absorption is described in Equation (VII) below:

$$T_\lambda = 10^{-\alpha_\lambda l} \tag{VII}$$

Where:

$\alpha_\lambda$=absorption coefficient (cm$^{-1}$) at wavelength $\lambda$ l=path length (cm)

Photochemical processes can be initiated only by the photons that are absorbed by the targeted medium. Absorbance is related to the concentrations of absorbing constituents in accordance with Equation (VIII) below:

$$A_\lambda = \sum_i \varepsilon_{\lambda i} c_i l \tag{VIII}$$

where:

$\varepsilon_{\lambda i} C_I$=molar absorption coefficient (M$^{-1}$ cm$^{-1}$) at wavelength $\lambda$ and concentration (M) of constituent i in the fluid ll=pathlength (cm)

Absorbance and transmittance are related by Equation (IX) below:

$$A_\lambda = -\log T_\lambda \tag{IX}$$

or $$T_\lambda = 10^{-A_\lambda}$$

While suspended solids can absorb light and contribute to a reduction in UV transmittance, it is commonly known that this does not always have a linear effect, and neither does it necessarily dominate the process. In terms of importance to any photodissociation process requiring accurate dosage of UV light, the measurement of UV transmission is more meaningful than turbidity. Therefore, processes that rely upon monitoring fluid turbidity when determining actual UV dosage can be entirely inaccurate and ineffective. The method of the present invention advantageously measures UV transmission instead of turbidity, and incorporates in each UV reactor module a detector interface for use with one or more UV transmission detectors. Such detector interface also allows the addition of auxiliary contaminant level detectors. Such detection tools will become widely available in the future, providing real-time indication of various contaminants of interest, such as microorganisms and toxic organic compounds. The method and apparatus of the present invention enable additional and important closed-loop feedback capabilities that can further increase the accuracy an efficiency of large-scale UV photodissociation applications.

While the foregoing description includes detail which will enable those skilled in the art to practice the invention, it should be recognized that the description is illustrative in nature and that many modifications and variations will be apparent to those skilled in the art having the benefit of these teachings.

What is claimed is:

1. A method of decontaminating a fluid contaminated with UV-sensitive microorganisms and/or organic compounds, comprising the steps of:

(1) providing an apparatus comprising:
      (A) a single UV reactor module or a plurality of UV reactor modules, each UV reactor module comprising:
         (a) an influent flow conduit;
         (b) a variable speed pump disposed in the influent flow conduit, the pump being capable of rotating at a speed determined by a pump-speed control signal;
         (c) a UV reactor disposed in the influent flow conduit downstream of the variable speed pump, the UV reactor having an interior chamber containing.
            (i) a reactor flow passage disposed downstream of and in fluid communication with the influent flow conduit, the reactor flow passage having an inlet and an outlet;
            (ii) a UV flashlamp disposed in the reactor flow passage and capable of emitting one or more pulses of ultraviolet light having a wavelength in the UV-C range, wherein the flashlamp emits the one or more pulses at a UV intensity and pulse repetition rate determined by a lamp-output control signal; and
            (iii) at least one UV transmission detector disposed at a location in the reactor flow passage so as to measure UV transmissivity of a portion of a substream of the fluid passing proximate to said location, the detector being capable of generating an output signal indicative of the measured UV transmissivity; and
      (B) a system-wide control module disposed in independent electrical communication with each UV reactor module, the control module being capable of generating said pump-speed control signal and the lamp-output control signal and of receiving the UV transmissivity output signal, the control module being programmable to generate additional pump-speed control signals and lamp-output control signals in response to the UV transmissivity signal;

wherein the control module is preprogrammed to send a first pump-speed control signal to the pump in each UV reactor module to cause the pump to rotate at a speed sufficient to provide a predetermined first flow rate through the influent flow conduit and the reactor flow passage;

further wherein the control module is preprogrammed such that as a fluid substream flows through the reactor flow passage, the control module sends a first lamp-output control signal to the UV flashlamp in each UV reactor module to cause the flashlamp to emit one or more pulses of ultraviolet light at a predetermined first energy per pulse, the one or more pulses of ultraviolet light having a wavelength in the Uv-C range;

(2) directing flow of a substream of the fluid through the influent flow conduit, the substream passing through the influent flow conduit at the predetermined first flow rate; and (3) directing flow of the substream through the reactor flow passage from the inlet to the outlet thereof such that the substream passes proximate to the UV flashlamp and proximate to the UV transmission detector, the substream flowing through the passage at the predetermined first flow rate; wherein during flow of the substream through the flow passage, a portion of the substream is exposed to the one or more pulses of ultraviolet light emitted by the UV flashlamp in response to the first lamp-output control signal generated by the control module; the UV transmission detector measuring UV transmissivity of a portion of the substream passing proximate to the detector and transmitting a UV transmissivity output signal to the control module indicative of the measured UV transmissivity, wherein the control module is preprogrammed to analyze said UV transmissivity signal to determine whether the portion of the substream subjected to the one or more pulses of ultraviolet light received a targeted UV dose, further wherein if said portion of the substream did not receive the targeted UV dose, the control module is preprogrammed to send (i) a second pump-speed control signal to effect a second flow rate in the influent flow conduit and the reactor flow passage, and/or (ii) a second lamp-output control signal to effect emission of one or more pulses of ultraviolet light at a second UV intensity and/or a second pulse duration; wherein the second flow rate and/or the second UV intensity and/or the second pulse duration are such subsequent portions of the substream exposed to the one or more pulses of ultraviolet light receive said targeted UV dose.

2. A method according to claim 1, wherein, in the apparatus provided in step (1), the UV flashlamp is disposed coaxially with a longitudinal axis of the reactor flow passage extending between the inlet and outlet of the passage.

3. A method according to claim 2, wherein the UV flashlamp is disposed midway between the inlet and outlet of the reactor flow passage.

4. A method according to claim 1, wherein, in one or more of the UV reactor modules of the apparatus provided in step (1), the UV reactor further comprises at least one auxiliary contaminant level detector.

5. A method according to claim 4, wherein the UV reactor comprises two auxiliary contaminant level detectors, wherein one of the detectors is disposed at an upstream end of the reactor flow passage and the other of the detectors is disposed at a downstream end of the reactor flow passage.

6. A method according to claim 1, wherein the apparatus provided in step (1) further comprises an influent reservoir for holding a fluid to be disinfected and an influent conduit disposed between and in fluid communication with the influent reservoir and the influent flow conduit of each of the UV reactor modules.

7. A method according to claim 6, wherein the reservoir has disposed therein an influent level sensor which senses influent flow rate changes and transmits an output signal to the control module indicative of said flow rate changes.

8. A method according to claim 1, wherein the apparatus provided in step (1) further comprises an effluent conduit disposed downstream of and in fluid communication with the outlets of each of the UV reactor modules.

9. A method according to claim 1, wherein, in the apparatus provided in step (1), the system-wide control module comprises a stored program microprocessor.

10. A method according to claim 1, wherein, in the apparatus provided in step (1), the variable-speed pump is a positive displacement pump.

11. A method according to claim 1, wherein, in the apparatus provided in step (1), each UV reactor module further comprises a microprocessor-based reactor-control unit which is disposed in electrical communication with the system-wide control module.

12. A method according to claim 1, wherein, in the apparatus provided in step (1), the plurality of UV reactor modules are disposed in a parallel arrangement.

13. A method according to claim 1, wherein, in the apparatus provided in step (1), the plurality of UV reactor modules are disposed in a serial arrangement.

14. An apparatus for decontaminating a fluid contaminated with UV-sensitive microorganisms and/or organic compounds, comprising:

(A) a single UV reactor module or a plurality of UV reactor modules, each UV reactor module comprising:
   (1) an influent flow conduit;
   (2) a variable speed pump disposed in the influent flow conduit, the pump being rotatable at a speed determined by a pump-speed control signal;
   (3) a UV reactor disposed in the influent flow conduit downstream of the variable speed pump, the UV reactor having an interior chamber containing:
      (i) a reactor flow passage disposed downstream of and in fluid communication with the influent flow conduit, the reactor flow passage having an inlet and an outlet;
      (ii) a UV flashlamp disposed in the reactor flow passage and capable of emitting one or more pulses of ultraviolet light having a wavelength in the UV-C range, wherein the flashlamp emits the one or more pulses at an energy per pulse determined by a lamp-output control signal; and
      (iii) at least one UV transmission detector disposed at a location in the reactor flow passage so as to measure UV transmissivity of a portion of a substream of the fluid passing proximate to said location, the detector being capable of generating an output signal indicative of the UV transmissivity; and (B) a control module disposed in independent electrical communication with each UV reactor module, the control module being capable of generating said pump-speed control signal and the lamp-output control signal and of receiving the UV-transmissivity output signal, the control module being programmable to generate additional pump-speed control signals and lamp-output control signals in response to the UV-transmissivity signal so as to cause subsequent portions of the substream exposed to the one or more pulses of ultraviolet light to receive a targeted UV dose.

15. An apparatus according to claim 14, wherein the UV flashlamp is disposed coaxially with a longitudinal axis of the reactor flow passage extending between the inlet and outlet of the passage.

16. An apparatus according to claim 15, wherein the UV flashlamp is disposed midway between the inlet and outlet of the reactor flow passage.

17. An apparatus according to claim 14, wherein, in one or more of the UV reactor modules, the UV reactor further comprises at least one auxiliary contaminant level detector.

18. An apparatus according to claim 17, wherein the UV reactor comprises two auxiliary contaminant level detectors, wherein one of the detectors is disposed at an upstream end of the reactor flow passage and the other of the detectors is disposed at a downstream end of the reactor flow passage.

19. An apparatus according to claim 14, further comprising an influent reservoir for holding a fluid to be disinfected and an influent conduit disposed between and in fluid communication with the influent reservoir and the influent flow conduit of each of the UV reactor modules.

20. An apparatus according to claim 19, wherein the reservoir has disposed therein an influent level sensor which senses influent flow rate changes and transmits an output signal to the control module indicative of said flow rate changes.

21. An apparatus according to claim 14, further comprising an effluent conduit disposed downstream of and in fluid communication with the outlets of each of the UV reactor modules.

22. An apparatus according to claim 14, wherein the control module comprises a stored program microprocessor.

23. An apparatus according to claim 14, wherein the variable-speed pump is a positive displacement pump.

24. An apparatus according to claim 14, wherein each UV reactor module further comprises a microprocessor-based, reactor-control unit which is disposed in electrical communication with the system-wide control module.

25. An apparatus according to claim 14, wherein the plurality of UV reactor modules are disposed in a parallel arrangement.

26. An apparatus according to claim 14, wherein the plurality of UV reactor modules are disposed in a serial arrangement.

* * * * *